Feb. 23, 1943. C. H. MURFIN 2,312,183
EMBLEM SECURING DEVICE
Filed May 27, 1941

Inventor
CLIF H. MURFIN
By H. S. Babcock
Attorney

Patented Feb. 23, 1943

2,312,183

UNITED STATES PATENT OFFICE 2,312,183

EMBLEM SECURING DEVICE

Clif H. Murfin, Portsmouth, Ohio

Application May 27, 1941, Serial No. 395,417

3 Claims. (Cl. 40—125)

The invention to be hereinafter described relates to securing devices for emblems, such as automobile club emblems and the like.

In addition to the national club emblem—i. e., "A. A. A."—each local club has its emblem or designation. In a large proportion of cases about the same arrangement for mounting the emblem in place and about the same devices have been used. This is a flat stamping of sheet metal as a backing, base or foundation. It is made with a body portion in the form of an open frame and one or more extensions by which it may be connected to a bumper, tag-bracket, post or other anchoring means. A very common and widely used stamping has an elliptical body with an elliptical opening. From the lower side of the ends of the ellipse elbows extend downwardly and outwardly and are provided with elongated slots for the passage of bolts or bolt ends for connecting the stamping in place. To the front of this stamping is secured the respective emblem. It is made of the same size and shape as the elliptical body of the stamping. The elliptical band corresponding to that of the stamping may carry what ever state or other club designation is desired, while the three "A's" designating the national organization may be countersunk in the center opening and framed by the band, in well known manner. There have been various ways of securing the emblem in place on its bracket, as by bolts and nuts passed through both, or hooks or fingers extending from the plate or stamping about the edge of and over the face of the emblem. One way, at present, in considerable use, is what is known as a "speed-nut." Actually this is a spring washer. In its use, the emblem is provided with a short cylindrical stud or post at each end and the stamping is provided with corresponding holes. When the stamping and emblem have been assembled, the "speed-nuts" are forced down over their projecting ends, that is, the ends of the studs projecting through the holes in the plate or bracket body. These "speed-nuts" are, actually, spring washers of resilient metal punched centrally with square holes of very slightly less width than the diameter of the stud. From two diagonally opposite corners of the squares of the washers are slitted for a short distance toward the outer edge. This provides two similar resilient, pronged or V-shaped gripping teeth. As each "speed-nut" is forced down over its stud to seat against the stamping the gripping prongs are sprung outwardly or upwardly. As the "speed-nut" seats, its prongs bear against the sides of the stud and any effort to move the "speed-nut" back off of the stud simply drives the teeth more deeply into the stud. One serious objection is that it leaves a crude and unfinished appearance. Another objection is that the washers do not lie flat, smooth or even against the stamping. Due to the thinness, small diameter and strain of springing the teeth, the washers buckle and bend so that their edges stand away from the bracket stamping and provide obstructions against which things readily catch.

The main objects of the present invention are to overcome and avoid the above and other objections and provide a simple, efficient, durable, compact and artistic securing means whereby an emblem may be reliably and lastingly secured in place with least work and greatest certainty.

In order to more clearly disclose the construction, operation and use of the invention, reference should be had to the accompanying drawing forming part of this application. Throughout the several figures of the drawing like reference characters designate the same parts in the different views.

Figure 1:
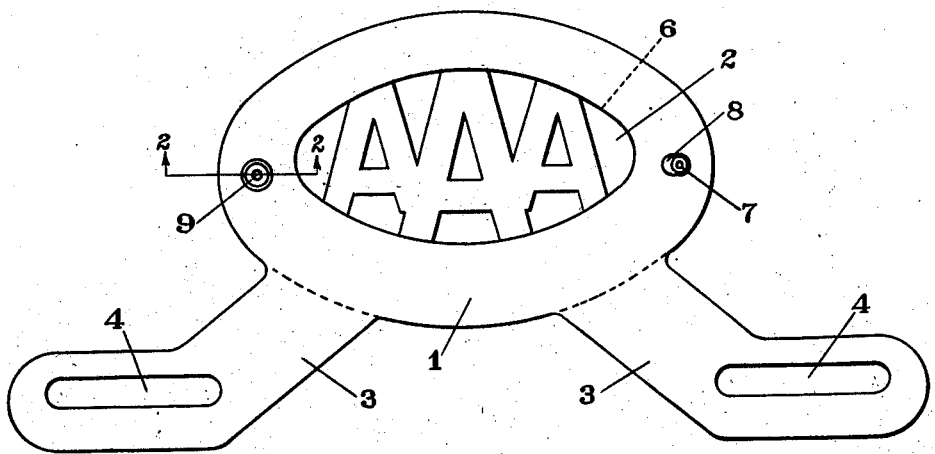
Fig. 1 is a rear view of the assembled invention ready to be connected to an automobile, but with one securing thimble removed, for clearness.
Figure 2:
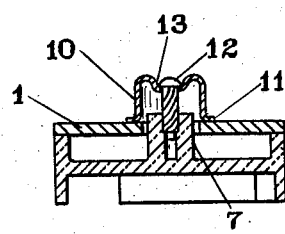
Fig. 2 is an enlarged fragmentary cross section on line 2—2 of Fig. 1.
Figure 4:
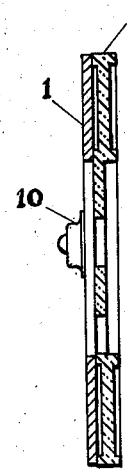
Fig. 4 is a vertical cross section through the middle of Fig. 1.
Figure 3:
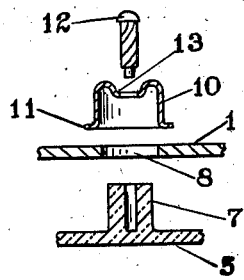
Fig. 3 is a group view of the fastening screw, thimble and stud, arranged in line of assembly, enlarged.

Referring to the drawing in detail, 1 indicates the body of the plate or bracket or stamping which, in the instance shown, is substantially elliptical in outline with a concentrical opening 2 therethrough, leaving a band of from ¾ of an inch to an inch in width between the inner and outer ellipses. From one side of this elliptical body or frame extends, near each end, an elbow or arm 3 having an elongated slot 4 by which the plate or stamping may be readily connected to an automobile. Elongation of slots 4, of course, enables use of bolts or the like spaced at various distances so that the plate may be connected without alteration to a wide variety of supports on various types, makes and styles of automobiles, trucks, etc.

The emblem shown comprises an elliptical plate or band 5 of approximately the same shape and size as the body 1 and having an elliptical opening 6 of substantially the same dimensions as opening 2. Across the ellipse 6 should be arranged the club insignia, in the instance illustrated, the three "A's" of the national organization—i. e. American Automobile Association. As a matter of adding prominence to the letters of the insignia, they are, preferably, countersunk, relatively to the band 5. The face of the band 5 may carry the name of the respective state and the words "automobile club," in any desired order or arrangement, to designate the particular state club. Having the letters slightly raised and in colors contrasting with the band, will render them more prominent or noticeable.

Preferably, the emblem is of suitable plastic material readily moldable and adapted, after molding, to retain its molded form indefinitely. This will permit countersinking the characters within the ellipse and raising the letters on the face of the emblem, as will be readily understood.

In order to secure the emblem in place on the stamping or plate 1, hollow cylindrical studs 7 are molded integrally with the emblem at each end and about midway between the inner and the outer edge or ellipse of band 5. Studs 7 are of sufficient length to extend through the stamping 1 and project far enough beyond to adequately receive the securing thimble, as will later appear. The stamping 1 is provided with corresponding elongated slots 8 through its ends, the elongation being in the direction of the longitudinal axis of the stamping. These emblems and stampings are intended and designed for quantity production. Where such articles are produced in quantity there are small inaccuracies for which certain considerable tolerances must be provided to avoid undue waste. That is one reason for elongating slots 8. However, the important reason is to accommodate the different coefficients of expansion and contraction of the two materials—i. e. metal and plastic. In assembling, studs 7 are slipped through slots 8 so that the back of emblem 5 seats smooth and flush against the front face of 1. If slots 8 were circular, of the same diameter as 7 and the same distance apart as 7 and there was such absolute accuracy as to guarantee that relation between each and every emblem and stamping, there would be no difficulty in assembling. But, in quantity production that cannot be the case. So, by slightly elongating slots 8, a considerable range of slight variations may be easily accommodated. Thus, the studs may vary in diameter, slightly, they may vary in distance apart, slightly, and yet, without interfering with assembly. This slot elongation, however, leaves an otherwise objectionable opening through the stamping around each stud.

Cooperating with studs 7 and stamping 1 are thimbles 9 which are adapted to fit down over the studs like inverted cups or caps. Each such thimble comprises a cylindrical body 10 of slightly greater diameter than stud 7 and of slightly greater length than that part of the stud projecting beyond the stamping. And each thimble is provided with a narrow circumferential flange 11 directed radially outwardly about its lower edge, which, in assembled relation, rests on stamping 1 and provides a considerable bearing surface thereagainst. As shown in Fig. 1, thimble 9, including flange 11 is of sufficient extent radially to completely cover the gap above mentioned between stud 7 and the edge of slot 8. So, when assembled with thimbles applied, there are no gaps visible through plate 1 around studs 7.

To secure the thimbles 9 to the studs 7 so that flanges 11 may engage stamping 1 to lock or secure the emblem to the stamping, small quick-acting screws 12 are used. The bottom or closed end of each thimble is centrally perforated for free passage of the screw shank or stem and the remainder of the bottom is inwardly dished or countersunk as at 13 so that the screw head may seat in the countersink against the thimble end and, at the same time, below the side wall of the thimble. The length of the screw is sufficient to extend through the stud 7 and partly through the body 5 of the emblem when fully driven home with its head against the thimble and bearing on the upper end of the stud. For this reason, the thimble is of such dimensions that the countersunk portion will just rest upon the upper end of stud 7 when the parts are in fully assembled relation.

As will be readily understood, the quick-acting screws may be readily forced to holding position in any one of several well known ways, cutting their own threads in the plastic material of the studs, and thereby securely anchoring the thimbles to the studs and, through them, the emblem to the stamping. Instead of quick-acting screws, regular screws of the right size and type could be turned in or very short small nails with roughened surfaces could be driven in. All such will give secure anchorage or hold to connect the parts.

Various other shapes, outlines or configurations of emblems and stampings may be used as will be well understood.

Likewise, it will be clear that the securing device may be used in various other ways than that of securing an emblem to a support. It may be used in practically any case where it is desired to secure two relatively thin flat pieces together. One is provided with a stud, the other with a hole to receive the stud, a thimble is provided to receive the stud and to bear on the stamping, and a screw is provided for connection with the stud and to engage the thimble and bind it against the stamping, a flange being provided for extended bearing surface and to bridge the gap allowed for tolerance, the head of the anchoring screw being shielded by the thimble side wall above the countersunk thimble bottom.

It is thought that the construction, operation and use of the invention will be clear from the preceding detailed description.

Many changes may be made in the construction, arrangement and disposition of the various parts of the invention within the scope of the appended claims without in any way departing from the field of the invention, and it is meant to include all such within this application wherein only one preferred form has been shown, purely by way of illustration and with no thought or intention of, in any degree, limiting the claims thereby.

Having thus described my invention, what I claim and desire to protect by Letters Patent is:

1. In combination, a securing device of the character described comprising, an emblem bearing plate provided with a plurality of spaced studs, a stamping supporting said plate and provided with a corresponding number of cooperating openings therethrough for reception of said studs, the openings being slightly larger than the studs, thimbles positioned over the ends of said studs and provided with flanges bearing on said stamping and bridging the space between stud and stamping said thimbles having perforated countersunk ends, bridging said studs and screws passing through said thimbles into said studs and anchoring said thimbles to said studs, said screws engaging said countersunk thimble ends below the outer ends of the side walls of the thimbles.

2. In combination, a securing device of the character described comprising an emblem bearing plate provided with an integrally formed tubular stud extending from and wholly on the rear side of said plate, a stamping supporting said plate and provided with a corresponding opening therethrough for reception of said stud, the opening being slightly larger than the stud, a thimble positioned over the end of said stud and provided with a flange bearing on said stamping and bridging the space between stud and stamping and having a perforated and countersunk end bridging said stud, and a screw passing through said thimble into said stud, terminating short of the rear face of said plate and anchoring said thimble to said stud, said screw engaging said countersunk thimble end below the outer end thereof.

3. In combination, a securing device of the character described comprising an emblem bearing plate provided with an integrally formed tubular stud extending from and wholly on the rear side of said plate, a stamping supporting said plate and provided with a corresponding opening therethrough for the reception of said stud, a thimble positioned over the end of said stud and provided with a flange bearing on said stamping and having a perforated and countersunk end, and a screw passing through said thimble into said stud, terminating short of the rear face of said plate, and anchoring said thimble to said stud, said screw engaging said countersunk thimble end below the outer end thereof.

CLIF H. MURFIN.